Patented Dec. 31, 1940

2,227,059

UNITED STATES PATENT OFFICE 2,227,059

TERPENE-CYANOACYL COMPOUND AND METHODS OF PRODUCING SAME

Joseph N. Borglin, Wilmington, Del., assignor to Hercules Powder Company, Wilmington, Del., a corporation of Delaware No Drawing. Application December 27, 1939, Serial No. 311,171

14 Claims. (Cl. 260—454)

This invention relates to terpene thiocyanoacyl esters in which the acyl group is that of a higher fatty acid and to their seleno and telluro counterparts. It also relates to a method for their preparation.

By the method in accordance with this invention, I react a terpene which contains one or more double bonds or which contains one or more hydroxyl groups within its structure with a halogenated higher fatty acid and then with a metal thiocyanate, a metal selenocyanate, or a metal tellurocyanate which is reactive under the conditions employed. There is obtained a compound of the type formula ROOCR'XCN in which R is a radical of a terpene compound, in which the group OOCR' is a radical of a higher fatty acid, and in which X is a sulfur, selenium, or tellurium.

The terpene which I employ may be an unsaturated terpene hydrocarbon such as, for example, pinene, terpinene, terpinolene, camphene, fenchene, dipentene, menthene, sylvestrene, phellandrene etc. Again it may be a saturated or unsaturated terpene alcohol. It may be a terpene secondary alcohol, such as, for example, fenchyl alcohol, borneol, isoborneol, etc.; a terpene tertiary alcohol such as terpineol, hydroterpineol, etc.; a terpene polyhydric alcohol such as terpin, sobrerol, etc.; a condensate of formaldehyde and an unsaturated terpene compound, etc., or it may be a terpene ether such as, for example, terpinyl methyl ether, terpinyl ethyl ether, terpinyl butyl ether, ethylene glycol ether of pinene, diethylene glycol ether of pinene, glycerol ether of pinene. Commercial terpene cuts such as gum or wood turpentine, pine oil, etc. are suitable.

The halogenated higher fatty acid which I utilize may be, for example, monochlorolauric, monochloromyristic, monochloropalmitic, monochloromargaric, monochlorostearic, monochlororichidic, monochlorobehenic, monochloromontanic, monochloromelissic, monochloroleic, monochlororicinoleic, monochloroerucic acid, etc., or a dichloro or polychloro derivative of a higher fatty acid such as those mentioned or similar bromo-, iodo-, or fluoro- substituted higher fatty acids. Mixtures of halogenated higher fatty acids may be used; for example, the mixture of acids derived from coconut oil, from cottonseed oil, from rapeseed oil, from castor oil, etc., or other mixtures may suitably be used in their halogenated form.

The metal thiocyanate which I may use may be any metal thiocyanate which is reactive under the conditions employed. To be reactive under the conditions employed, it must be partially or completely soluble in the reaction mixture utilized. Suitable metal thiocyanates, for example, are sodium thiocyanate, potassium thiocyanate, lithium thiocyanate, ammonium thiocyanate, calcium thiocyanate, etc. When it is desired to make a selenocyanoacylate, the metal selenocyanate I may use, may be, for example, sodium selenocyanate, potassium selenocyanate, lithium selenocyanate, calcium selenocyanate, ammonium selenocyanate, etc., and similarly, the metal tellurocyanate which I may use, may be, for example, sodium tellurocyanate, potassium tellurocyanate, lithium tellurocyanate, ammonium tellurocyanate, etc.

The reaction in accordance with this invention will desirably be carried out in two steps. The terpene compound will first be reacted with a halogenated higher fatty acid and the resulting ester of the terpene isolated from by-products of the reaction. Preferably, acidic materials are removed. The second stage of the reaction is the treatment of this halogen acid ester with the metal thiocyanate, selenocyanate, or tellurocyanate as the case may be, followed by recovery of the product. I may carry out each of these steps in the presence of a suitable inert solvent and in fact I prefer to use an inert solvent such as, for example, methanol, ethanol, propanol, isopropanol, butanol, acetone, ethyl acetate etc. in the second stage. Each step of my process may be carried out at any temperature within the range of about 0° C. to about 250° C., and preferably within the range of about 50° C. to about 180° C.

The halogen substituted acylates of the first stage reaction are light in color if the reaction is carried out in the absence of oxygen, for example, under a blanket of $CO_2$. Substantially water-white esters may be obtained by vacuum distillation. The color of the thiocyanoacylates products follows the color of the first stage ester from which they are prepared. Where very light-colored products are desired and where it is desired to insure products of no odor or minimum odor, the first stage reaction may be conducted, if desired, in a non-oxidizing atmosphere, or the first stage product may be vacuum distilled, or both these measures may be taken.

The method in accordance with this invention will be further illustrated by the examples which follow. All parts and percentages will be by weight unless otherwise specified.

Example 1

A mixture of 13.6 parts of camphene and 18.2 parts of alpha-bromostearic acid was heated for 30 hours in an oil bath at 110–125° C., and for 18 hours at 140–155° C. The reaction product mixture was then steam distilled to remove excess camphene. The residue, containing the isobornyl bromostearate derived from the camphene, was 20.6 parts by weight and contained 18.1% bromine.

18.8 parts of the first stage product was mixed with 40 parts of 95% ethanol and 12 parts of sodium thiocyanate, and the mixture was refluxed for one hour. The mixture was then diluted with 100 parts of benzene and washed with water repeatedly. Volatile solvent was removed by evaporation at reduced pressure. A yield of 14.7 parts of product analyzing 7.1% sulfur, and containing the isobornyl alpha-thiocyanostearate derived from the camphene, was obtained.

Example 2

28 parts of a mixture of bromo substituted acids obtained by the bromination of coconut oil fatty acids and consisting mainly of alpha-bromolauric acid were mixed with 27.2 parts of alpha-pinene. The mixture was heated for 3 days at 125° C. under a blanket of carbon dioxide. The reaction mixture was then steam distilled to remove excess pinene. The residue, 33.1 parts, containing the terpene esters had a bromine content of 23.4%.

31.4 parts of the first stage product was mixed with 40 parts of 95% ethyl alcohol and 25 parts of sodium thiocyanate, then the mixture was refluxed for one hour. 35 parts of commercial heptane and 40 parts of benzene were then added and the resulting solution was washed repeatedly with water. Finally volatile solvents were evaporated at reduced pressure. A yield of 25.6 parts of product analyzing 9% sulfur, and containing the mixed thiocyanoacyl esters, was obtained.

Example 3

A mixture of 27.2 parts of camphene and 28 parts of the brominated coconut oil fatty acids used in Example 2 was heated for 3 days under a blanket of carbon dioxide in an oil bath at 125° C. The reaction mixture was then subjected to steam distillation to remove excess camphene. A residue of 31.2 parts containing the bromo fatty acid esters of isoborneol and having a bromine content of 21.1% was obtained.

29.5 parts of this first stage product were mixed with 80 parts of 95% ethanol and 25 parts of sodium thiocyanate and the mixture was refluxed for one hour. 70 parts of commercial heptane were then added and the solution washed with water repeatedly. The emulsions formed in this operation were broken by the addition of 40 parts of ethyl alcohol. Aqueous layers formed were extracted with heptane and the heptane extract was added to the main body of heptane solution. Volatile solvent was then evaporated off at reduced pressure. A yield of 25.2 parts of product, containing the isobornyl thiocyano fatty acid esters derived from the camphene, and having a sulfur content of 7.5%, was obtained.

Example 4

A mixture of 30.8 parts of borneol, 10 parts of xylene, and 28 parts of the brominated coconut oil fatty acids used in Example 2 was heated for 88 hours under a carbon dioxide blanket in an oil bath at 170° C. The reaction product was steam distilled to remove excess borneol. A residue of 39.1 parts having a bromine content of 16.1% and containing bromo esters of borneol was obtained.

37.2 parts of the first stage product was mixed with 80 parts of 95% ethyl alcohol and 25 parts of sodium thiocyanate and the mixture was refluxed for one hour. 70 parts of commercial heptane was then added and the resulting solution washed repeatedly with water. Volatile solvents were then evaporated off at reduced pressure. A yield of 35 parts of product, analyzing 5.3% sulfur, and containing the bornyl thiocyano fatty acid esters, was obtained.

Example 5

A mixture of 30.8 parts of fenchyl alcohol and 28 parts of the brominated coconut oil fatty acids used in Example 2 was heated 3 days under a blanket of carbon dioxide at 125° C., for 2 days at 140–150° C., and for 20 hours at 170–190° C. The reaction mixture was then steam distilled to remove excess fenchyl alcohol. The residue, 39.4 parts, containing the fenchyl bromo esters had a bromine content of 15%.

38.7 parts of this first stage product were mixed with 80 parts of 95% ethyl alcohol and 25 parts of sodium thiocyanate and the mixture was refluxed for one hour. The resulting mixture was then diluted with 70 parts of commercial heptane and then washed repeatedly with water. Volatile solvent was evaporated off at reduced pressure. A yield of 31.9 parts of product, containing the fenchyl thiocyano coconut fatty acid esters, and having a sulfur content of 6.3%, was obtained.

Example 6

A mixture of 27.2 parts of alpha-pinene and 44 parts of brominated commercial ricinoleic acid was heated for 3 days under a blanket of carbon dioxide at a temperature of 154–172° C. The reaction mixture was steam distilled to remove excess terpene. A residue of 36 parts containing mixed terpene esters of bromo ricinoleic acid and analyzing 23.6% bromine was obtained.

33.6 parts of the first stage product were mixed with 80 parts of 95% alcohol and 25 parts of sodium thiocyanate and the mixture refluxed for one hour. 70 parts of commercial heptane were then added and the resulting solution was washed repeatedly with water. Emulsions formed in the washing operation were broken by the addition of ethyl alcohol. Finally volatile solvent was evaporated off at reduced pressure. A yield of product, analyzing 5.6% sulfur, and containing the mixture of esters of thiocyanoricinoleic acid derived from the pinene, was obtained.

Example 7

A mixture of 27.2 parts of camphene and 44 parts of brominated commercial ricinoleic acid was heated and the reaction product treated as in Example 6. A residue of 31.2 parts having a bromine content of 13.7 and consisting mainly of the isobornyl ester of the bromoricinoleic acid was obtained.

29 parts of this first stage product was mixed with 80 parts of 95% ethanol and 25 parts of sodium thiocyanate and the mixture refluxed for one hour. The resulting mixture was diluted with 100 parts of a heptane-benzene mixture and the solution formed was washed repeatedly with water. Emulsions produced in the washing operations were broken by the addition of ethyl alcohol. Volatile solvent was evaporated off at reduced pressure. A yield of 27.6 parts of product containing the isobornyl thiocyanoricinoleic acid esters derived from the camphene was obtained.

*Example 8*

A mixture of 30.8 parts of fenchyl alcohol and 44 parts of brominated commercial ricinoleic acid was heated and the product recovered in the manner of Example 6. A residue of 44.4 parts having a bromine content of 29% and consisting chiefly of fenchyl bromoricinoleate was obtained. 42.2 parts of the first stage product were mixed with 80 parts of 95% ethyl alcohol and 25 parts of sodium thiocyanate and the mixture was refluxed for one hour. 90 parts of commercial heptane-benzene mixture were added and the solution was washed repeatedly with water. Emulsions formed during the washing operations were broken by the addition of alcohol. Volatile solvent was removed by evaporation at reduced pressure. A yield of 39 parts of product analyzing 4.9% sulfur and containing the fenchyl thiocyanoricinoleic acid ester was obtained.

The products of the examples contain unesterified terpene compounds and petroleum hydrocarbons in varying proportion. A certain portion of the original reactant is usually not esterified and, in addition, there may be some conversion of esters to terpene hydrocarbons in the second stage. The unesterified terpene compounds and petroleum hydrocarbons may be removed by vacuum distillation or vacuum steam distillation if desired. However, such removal is in general of no advantage since the products of this invention are conveniently utilized in diluted form for most purposes and since the diluents mentioned are in most cases colorless and of pleasant or slight odor. Similarly, complete removal of petroleum ether or other inert solvent from the product is usually unnecessary. However, I prefer to remove excess metal thiocyanate, selenocyanate, or tellurocyanate, and any other water soluble material from the product, for example, by thorough washing of a petroleum ether solution with water.

The compounds according to this invention are useful in insecticides. For example, they may be used in kerosene solution in a concentration between about 0.5% and about 20%, with or without other toxic agents such as pyrethrum and rotenone, as contact spray insecticides, or in emulsions, or on solid carriers. The compounds are also useful as flotation agents in the concentration of minerals. They may also be used as intermediates for the preparation of other compounds, such as, for example, wetting agents by treatment with an oxidation agent such as nitric acids. Many of the compounds possess wetting power without modification. It will be noted that emulsions with water were formed in some of the examples.

Where the term "pinene" is used herein it will be understood to include the alpha and beta forms. Similarly "terpineol" and "hydroterpineol" include the alpha, beta, and gamma forms.

This application is a continuation-in-part of my previous application, Serial No. 198,687, filed March 29, 1938, entitled "Terpene cyanoacyl compounds and methods of producing same", now Patent No. 2,217,811.

It will be understood that the details and examples hereinbefore set forth are illustrative only, and that the invention as broadly described and claimed is in no way limited thereby.

What I claim and desire to protect by Letters Patent is:

1. A terpene compound having the type formula ROOCR'XCN in which R is a radical of a terpene compound, in which the group OOCR' is a radical of a higher fatty acid, and in which X is a member of the group consisting of sulfur, selenium, and tellurium.

2. A terpene compound having the type formula ROOCR'SCN in which R is a radical of a terpene compound and in which the group OOCR' is a radical of a higher fatty acid.

3. A terpene compound having the type formula ROOCR'XCN in which R is the hydrocarbon radical of a terpene secondary alcohol in which the group OOCR' is a radical of a higher fatty acid, and in which X is a member of the group consisting of sulfur, selenium, and tellurium.

4. A bornyl thiocyanoacylate in which the acyl radical is derived from a higher fatty acid.

5. A fenchyl thiocyanoacylate in which the acyl radical is derived from a higher fatty acid.

6. A bornyl thiocyanoricinoleate.

7. A fenchyl thiocyanoricinoleate.

8. Thiocyanoacylates of a terpene secondary alcohol in which the acyl groups are derived from vegetable oil fatty acids.

9. Fenchyl thiocyanoacylates in which the acyl groups are derived from coconut oil fatty acids.

10. A method for the production of the terpene compound described in claim 1 which comprises reacting a terpene compound selected from the group consisting of unsaturated terpene compounds and saturated terpene alcohols with a halogenated higher fatty acid and then with a compound selected from the group of metal thiocyanates, metal selenocyanates, and metal tellurocyanates, which are at least partially soluble in the reaction mixture.

11. A method for the production of the terpene compound described in claim 1 which comprises reacting a terpene compound selected from the group consisting of unsaturated terpene compounds and saturated terpene alcohols with a chlorinated higher fatty acid and then with a metal thiocyanate which is at least partially soluble in the reaction mixture.

12. A method for the production of the terpene compound described in claim 1 which comprises reacting a terpene compound selected from the group consisting of unsaturated terpene compounds and saturated terpene alcohols with a brominated higher fatty acid and then with a metal thiocyanate which is at least partially soluble in the reaction mixture.

13. A method for the production of the terpene compound described in claim 1 which comprises reacting a terpene secondary alcohol with a chlorinated higher fatty acid and then with an alkali metal thiocyanate.

14. A method for the production of the terpene compound described in claim 1 which comprises reacting a terpene secondary alcohol with a brominated higher fatty acid and then with an alkali metal thiocyanate.

JOSEPH N. BORGLIN.